United States Patent
Hendricks

(10) Patent No.: US 11,076,713 B2
(45) Date of Patent: Aug. 3, 2021

(54) FOLDING ARTIFICIAL TREE DEVICE AND SYSTEM

(71) Applicant: Shining Sea Trading Company, West Valley City, UT (US)

(72) Inventor: Jared Hendricks, Draper, UT (US)

(73) Assignee: Shining Sea Trading Company, West Valley City, UT (US)

( * ) Notice: Subject to any disclaimer, the term of this patent is extended or adjusted under 35 U.S.C. 154(b) by 179 days.

(21) Appl. No.: 16/479,558

(22) PCT Filed: Jan. 19, 2018

(86) PCT No.: PCT/US2018/014564
§ 371 (c)(1),
(2) Date: Jul. 19, 2019

(87) PCT Pub. No.: WO2018/136820
PCT Pub. Date: Jul. 26, 2018

(65) Prior Publication Data
US 2019/0357717 A1 Nov. 28, 2019

Related U.S. Application Data

(60) Provisional application No. 62/448,323, filed on Jan. 19, 2017.

(51) Int. Cl.
*F16M 13/00* (2006.01)
*A47G 33/06* (2006.01)
(Continued)

(52) U.S. Cl.
CPC ............. *A47G 33/06* (2013.01); *A47G 33/12* (2013.01); *F16M 11/38* (2013.01); *F16M 11/42* (2013.01);
(Continued)

(58) Field of Classification Search
CPC ........ A47G 33/06; A47G 33/12; A47G 33/04; A47G 2033/1266; F16M 11/38;
(Continued)

(56) References Cited

U.S. PATENT DOCUMENTS 4,659,597 A    4/1987  Lau
5,970,655 A *  10/1999 Freeman ................ A47G 33/12
                                                    47/40.5

(Continued)

OTHER PUBLICATIONS

PCT Application No. PCT/US18/14564 filed Jan. 19, 2018, Jared Hendricks International Search Report, dated Apr. 26, 2018; 12 pages.

*Primary Examiner* — Todd M Epps
(74) *Attorney, Agent, or Firm* — Todd Alder

(57) ABSTRACT

An artificial tree stand device is disclosed and described. Such a device can include an upper tree frame configured to couple to and support an upper trunk portion of an artificial tree, a lower tree frame configured to couple to and support a lower trunk portion of the artificial tree, the upper tree frame being pivotally coupled to the lower tree frame, a tree stand base pivotally coupled to the lower tree frame, and wherein the upper tree frame, the lower tree frame, and the tree support base lock into a vertical position to display the artificial tree, and at least the upper tree frame unlocks to allow the upper tree frame to pivot into a storage position.

30 Claims, 5 Drawing Sheets

(51) Int. Cl.
*F16M 11/38* (2006.01)
*F16M 11/42* (2006.01)
*A47G 33/12* (2006.01)

(52) U.S. Cl.
CPC ............... *A47G 2033/1266* (2013.01); *F16M 2200/021* (2013.01)

(58) Field of Classification Search
CPC .. F16M 11/42; F16M 2200/021; A01G 17/04; A01G 17/14
USPC ....... 248/528, 529, 530, 511, 519, 524, 534, 248/150, 346.3, 176.1, 309.1; 47/40.5, 47/42, 43
See application file for complete search history.

(56) References Cited

U.S. PATENT DOCUMENTS

| | | | | |
|---|---|---|---|---|
| 7,914,168 | B2* | 3/2011 | Oliva | A41G 1/002 |
| | | | | 362/123 |
| 7,984,884 | B1* | 7/2011 | Iliev | A47G 33/12 |
| | | | | 248/146 |
| 8,993,077 | B2 | 3/2015 | Schooley | |
| 9,040,130 | B2 | 5/2015 | Schooley | |
| 10,321,781 | B2* | 6/2019 | Hendricks | A47G 33/12 |
| 2007/0092664 | A1 | 4/2007 | Chun | |
| 2010/0196628 | A1* | 8/2010 | Shooley | A47G 33/06 |
| | | | | 428/19 |
| 2015/0272250 | A1 | 10/2015 | Chen | |

* cited by examiner

FOLDING ARTIFICIAL TREE DEVICE AND SYSTEM

CROSS-REFERENCE TO RELATED APPLICATIONS

This application is a U.S. nationalization under 35 U.S.C. § 371 of International Application No. PCT/US18/14564, filed on Jan. 19, 2018, which claims the benefit of U.S. Provisional Patent Application No. 62/448,323, filed on Jan. 19, 2017, each of which is incorporated herein by reference in its entirety.

BACKGROUND

Natural and artificial decorative trees are used in a variety of situations, including parties, weddings, holidays, as well as in routine business and home decor. When using decorative trees, tree stands are often used to provide support to such decorative trees, as well as to facilitate movement, placement, and storage in a variety of circumstances and/or locations.

DESCRIPTION OF EMBODIMENTS

Figure 1A:
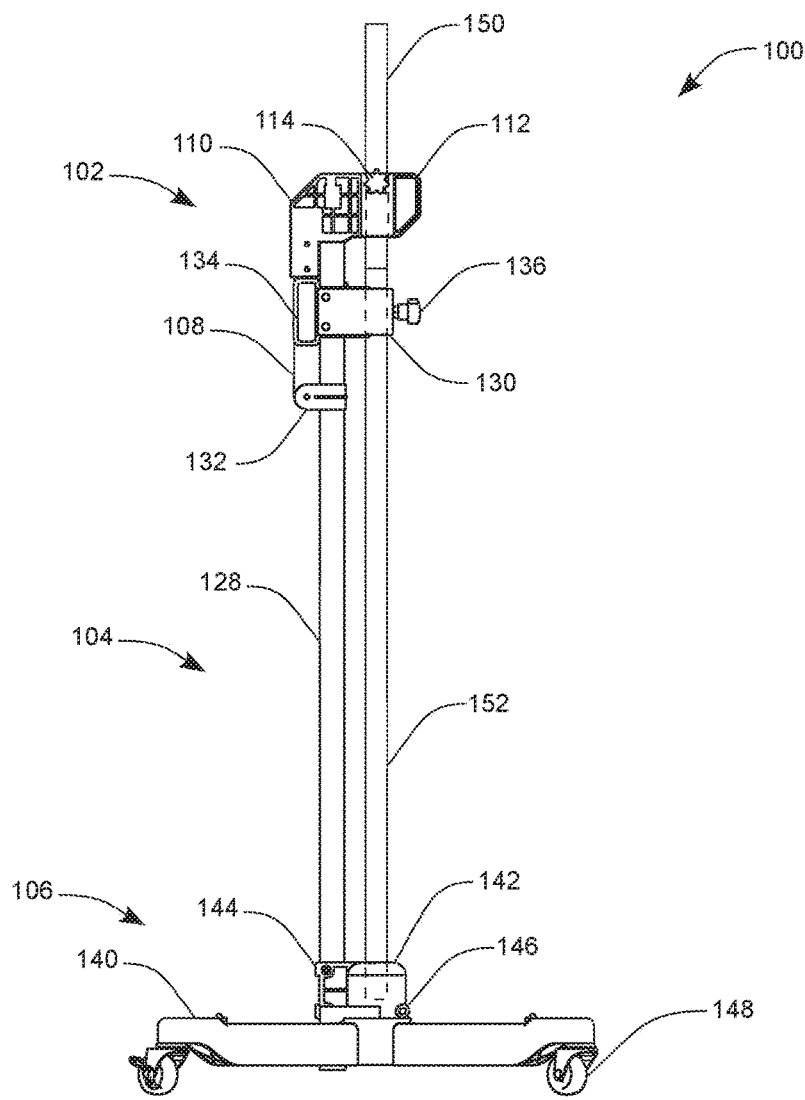
FIG. 1a illustrates a side view of an artificial tree stand in accordance with an example embodiment.

Although the following detailed description contains many specifics for the purpose of illustration, a person of ordinary skill in the art will appreciate that many variations and alterations to the following details can be made and are considered to be included herein. Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

"The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, "enhanced," "improved," "performance-enhanced," "upgraded," and the like, when used in connection with the description of a device or process, refers to a characteristic of the device or process that provides measurably better form or function as compared to previously known devices or processes. This applies both to the form and function of individual components in a device or process, as well as to such devices or processes as a whole.

As used herein, "coupled" refers to a relationship of physical connection or attachment between one item and another item, and includes relationships of either direct or indirect connection or attachment. Any number of items can be coupled, such as materials, components, structures, layers, devices, objects, etc.

As used herein, "directly coupled" refers to a relationship of physical connection or attachment between one item and another item where the items have at least one point of direct physical contact or otherwise touch one another. For example, when one layer of material is deposited on or against another layer of material, the layers can be said to be directly coupled.

As used herein, "adjacent" refers to the proximity of two structures or elements. In one example, elements that are identified as being "adjacent" may be either abutting or connected. In another example, such elements may also be near or close to each other without necessarily contacting each other. The exact degree of proximity may in some cases depend on the specific context.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

As used herein, numerical values as applied to the content of a material in a composition of materials, including numerical values relative to one another, such as ratios, can be considered to be measured in atomic % (i.e. at %).

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

An initial overview of technology embodiments is provided below and specific technology embodiments are then described in further detail. This initial summary is intended to aid readers in understanding the technology more quickly, but is not intended to identify key or essential technological features, nor is it intended to limit the scope of the claimed subject matter.

Description of Example Embodiments

Decorative trees, both artificial and natural, are commonly used in business and home decor, weddings, parties, holiday events, and many other settings. In some cases, decorative trees can be frequently relocated, which may include moving them in and out of doorways, around obstacles, loaded into vehicles or trailers, stored in compact spaces, or handled in a variety of other ways. Additionally, decorative trees are often removed from a supporting stand, broken down, stored in a storage container, and reassembled when needed. Such relocation, handling, and storage can be challenging, and can increase wear and tear on the trees, as well as any decorative lighting attached to the trees.

The inventor has discovered that many of the challenges and the premature degradation of a decorative tree and decorative tree lighting, can be reduced through the use of a pivoting or folding tree stand that, in some examples, includes wheels or castors.

Maintaining a decorative tree in the same stand for both display and storage purposes can greatly reduce both the difficulties in handling and the wear and tear on the tree. It is noted that designs capable of both display and efficient storage of a decorative tree can vary depending on a variety of factors, including, for example, design choice, the size of to the decorative tree, the desired storage conditions, and the like. As such, the present scope includes any tree stand design capable of displaying a decorative tree and pivoting or folding the tree into a storage position when not in use.

In one example, such a tree stand can display a decorative tree in a display position, such as, for example, a vertical or near-vertical position. For the present purposes, the term "vertical" is intended to be relative to a horizontal support surface, such as a floor. While the decorative tree can be displayed at a precisely vertical position, such is not required, and the present scope includes reasonable approximations of vertical as would be understood in the art. Additionally, the tree stand can be moved to one or more non-vertical positions to facilitated movement and/or storage of the decorative tree while still coupled to the tree stand. Such a non-vertical position allows the tree stand with the attached decorative tree to be moved through doorways, below light fixtures, and through and into areas that would not be accessible with the decorative tree in the vertical position. It is noted that "non-vertical" can include any position that a decorative tree can be tipped or folded to that facilitates movement and/or storage, and that excludes "vertical" positions. Further description of non-vertical positions is described below.

The present disclosure also provides a tree stand comprising a tree frame that couples to two or more sections of an artificial tree, and allows the artificial tree to be folded with the tree frame into a storage position. In other words, the two or more sections of the artificial tree remain coupled to the tree frame before, during, and after folding the tree frame into the storage position. In some examples, the tree frame can include a storage container or bag coupled thereto. In this case, the tree and the tree frame are folded into the storage position inside of the storage bag. Wheels or castors of the tree stand can be exposed through the bottom of the bag to allow rolling to a storage location.

A handle, lever, or other locking actuator can be coupled to the tree frame to allow locking and unlocking of the frame when moving from a display position to a storage position. In one example, the locking actuator is a handle that is coupled to a wire or cable that disengages a locking mechanism to thus release the tree frame from the display position. Locking mechanisms that lock the tree frame in a storage or other position are also contemplated. In some examples, each section of the tree frame coupled to a section of the artificial tree can include a separate locking actuator for unlocking and folding the associated tree frame section. In other examples, a single locking actuator can unlock multiple tree frame sections to facilitate folding.

In one non-limiting aspect, a tree stand can include a support base and a terminal trunk support pivotally coupled to an upwardly facing surface of the support base. The terminal trunk support is adapted to receive, coupled to, and support a terminal trunk end (i.e., a terminal section end) of an artificial tree in a display or vertical position, and to selectively pivot from the vertical position to a non-vertical position, or in other words, to recline or to otherwise drop into a storage position.

Figure 1B:
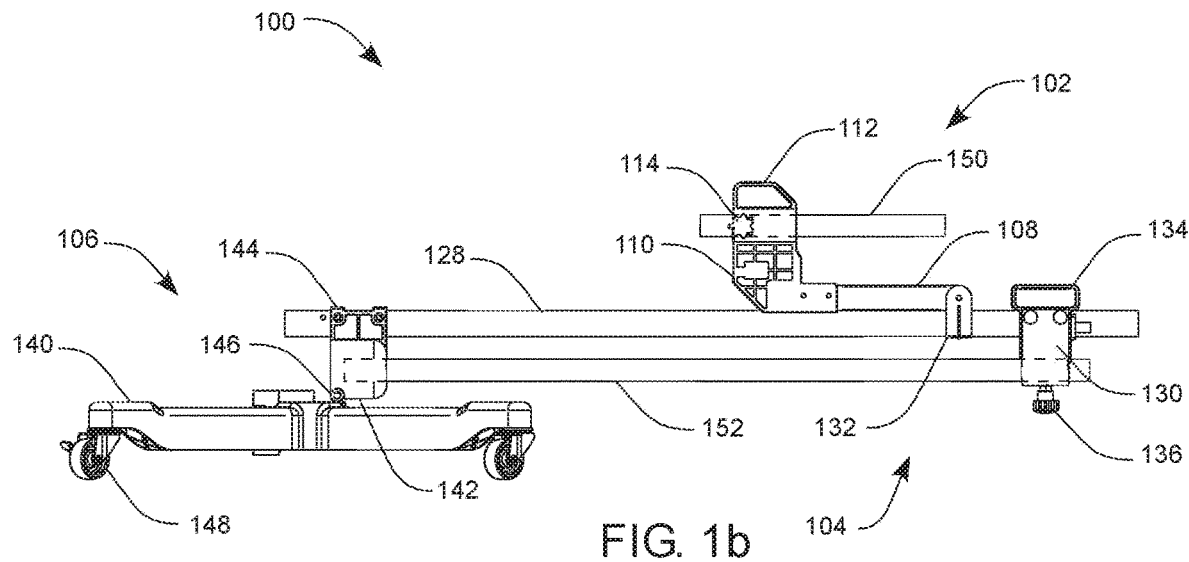
FIG. 1b illustrates a side view of an artificial tree stand in a storage position in accordance with an example embodiment.

One non-limiting example of an artificial tree stand 100 is shown in FIGS. 1a-b, which includes an upper tree frame 102, a lower tree frame 104, and a tree stand base 106. The upper tree frame 102 can be coupled to and support an upper trunk portion 150 of an artificial tree, and is pivotally coupled to the lower tree frame 104. The term "trunk" is used herein to refer to the center structure of an artificial tree that is often a pole or tube from which branches of the artificial tree extend. The artificial tree branches are not shown in some figures, including FIGS. 1a-b, for clarity reasons. The lower tree frame 104 can be coupled to and support a lower trunk portion 152 of the artificial tree, and is pivotally coupled to the tree stand base 106. The artificial tree stand 100 is shown locked in a vertical or display position, with the upper trunk portion 150 and the lower trunk portion 152 aligned along a common central axis. When unlocked, the artificial tree stand 100 can be folded into a number of nonvertical positions, including a storage position, such as, for example, a horizontal position. It is noted that, in some examples a storage position can include a vertically-oriented configuration where upper tree frame 102 is unlocked, thus allowing the upper tree frame 102 and the upper trunk portion 150 to pivot downward, while the lower tree frame 104 remains locked in the vertical position. FIG. 1b shows the artificial tree stand 100 unlocked and in a horizontal storage position, with the lower tree frame 104 pivoted relative to the tree stand base 106, and the upper tree frame 102 pivoted relative to the lower tree frame 104.

The upper tree frame 102 includes an upper linear support 108 and an upper trunk lock 110 having a structural configuration to couple and support the upper trunk portion 150. The lower tree frame 104 includes a lower linear support 128 and lower trunk lock 130 having a structural configuration to couple and support the lower trunk portion 152. The tree stand base 106 includes a base support 140 and a terminal trunk support 142 pivotally coupled thereto. The lower linear support 128 is coupled to the terminal trunk support 142, either as a permanent attachment or a removable attachment. As an example of a removable attachment, the terminal trunk support 142 can include a linear support coupler 144 having a structural configuration to receive the lower linear support 128, which is locked or otherwise secured therein. In some examples, the tree stand base 106 can include castors 148, or any other type of mechanism to facilitate movement of the artificial tree stand, including wheels, rollers, ball-and-socket devices, or the like.

The lower linear support 128 includes an upper pivot device 132 fixed thereto, to which the upper linear support 108 is pivotally coupled. Similarly, the base support 140 includes a lower pivot device 146 fixed thereto, to which the terminal trunk support 142 is pivotally coupled. As such, the upper pivot device 132 allows the upper tree frame 102 to rotate or otherwise pivot in a counter-clockwise direction in the view shown in FIG. 1, while the lower pivot device 146 allows the lower tree frame 104 to rotate or otherwise pivot in a clockwise direction in the view shown in FIG. 1. The upper pivot device 132 and the lower pivot device 146 can include the same or different pivot mechanism, without limitation. Nonlimiting examples of such mechanisms can include, hinges, ball joints, tension springs, or the like, including any other mechanism that allows structures to pivot, swivel, rotate, or similarly move relative to one another.

The base support can include any type of structure capable of supporting an artificial tree in both vertical and non-vertical positions. In some examples, the base support can include leg members extending out from a central or common location. In other aspects, the base support can include a solid structure such as a flat plate or disc, or an intermediate combination of a flat plate and leg members. Thus, the base support can include a structure having a variety of shapes and sizes, such as conical, pyramidal, trapezoidal, cylindrical, elliptical, rectangular, square, polygonal, or any other suitable shape, in both 2 dimensions and 3 dimensions.

Additionally, the base support, as well as any portion of the artificial tree stand and the upper and lower tree frames, can be made from any useful material including, without limitation, metals, polymers, ceramics, woods, and the like, including combinations thereof. The artificial tree stand, including the various components thereof, can be described in terms of "horizontal" and "vertical," as described above. As with the term "vertical," for the present purposes the term "horizontal" is intended to be relative to a horizontal support surface, such as a floor. Thus, a horizontally-oriented structure is one that is horizontal with respect to a supporting surface, as well as at reasonable approximations of horizontal as would be understood in the art, particularly given the added bulk of a given artificial tree, in which the definition of "horizontal" is increased to account for such bulk. Thus, "horizontal" can be understood in the context of the position in which the tree stand is being used to store an artificial tree.

The upper tree frame 102 can further include an upper tree frame handle 112 to assist a user in manipulating the upper tree frame 102 and any associated upper trunk portion 150 of the artificial tree. In the example shown in FIG. 1a, the upper tree frame handle 112 is an extension of the upper trunk lock 110. It is noted, however, that the upper tree frame handle can be a separate handle structure coupled to the upper trunk lock, coupled to the upper linear support 108, or any other structure that pivots with the upper tree frame. The upper tree frame 102 can additionally include an upper tension knob 114 coupled to the upper trunk lock 110 and positioned to secure the upper trunk portion 150 in the upper trunk lock 110. It is noted that any mechanism useful for securing the upper trunk portion in the upper trunk lock is considered to be within the present scope. Nonlimiting examples can include tension couplings, threaded fittings, bolts, screws, adhesives, pin connections, and the like.

The lower tree frame 104 can further include a lower tree frame handle 134 to assist a user in manipulating the lower tree frame 104 and any associated lower trunk portion 152 of the artificial tree. In the example shown in FIG. 1a, when the upper tree frame 102 is pivoted relative to the lower tree frame 104, the handle opening in the lower tree frame handle 134 is exposed for use by the user. It is noted, however, that the lower tree frame handle can be coupled to the lower linear support 128 or to any other structure that pivots with the lower tree frame 104. The lower tree frame 104 can additionally include a lower tension knob 336 coupled to the lower trunk lock 130 and positioned to secure the lower trunk portion 152 in the lower trunk lock 130. It is noted that any to mechanism useful for securing the lower trunk portion in the lower trunk lock is considered to be within the present scope. Nonlimiting examples can include tension couplings, threaded fittings, bolts, screws, adhesives, pin connections, and the like.

Figure 2:
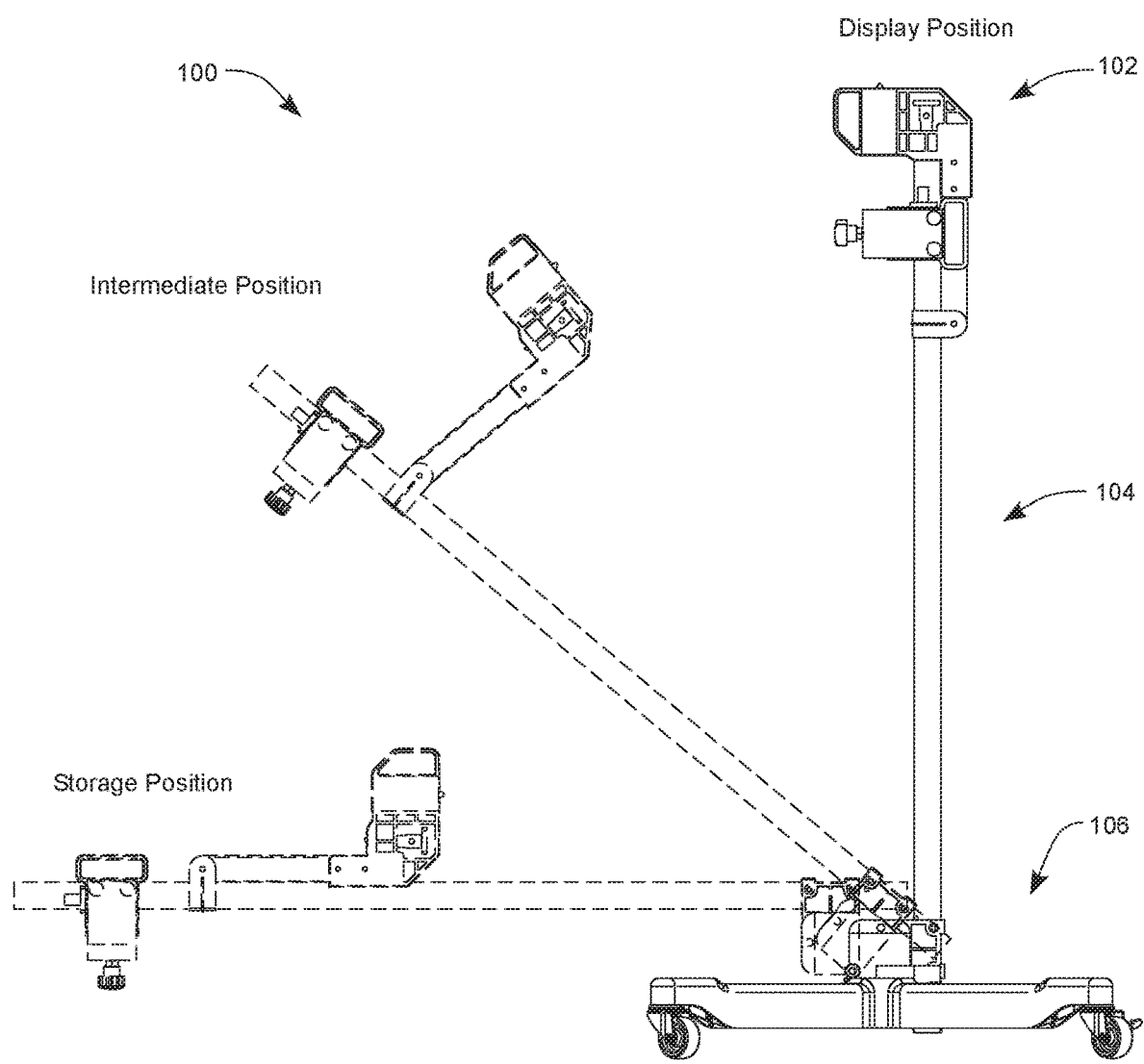
FIG. 2 illustrates a side view of an artificial tree stand in multiple pivoting positions in accordance with an example embodiment.

FIG. 2 shows an example of the pivoting motion of components of an artificial tree stand 100 moving from a vertical display position to a horizontal storage position. Specifically, the upper tree frame 102 and the lower tree frame 104 are unlocked to allow pivoting. The lower tree frame 104 pivots with respect to the tree stand base 106 to lower the associated lower section of the artificial tree, and the upper tree frame 102 pivots with respect to the lower tree frame 104, thus folding the associated upper section of the artificial tree toward the lower tree frame 104, as is shown at the intermediate position of FIG. 2. The lower tree frame 104 continues to pivot to lay the lower artificial tree section down in the storage position, while the upper tree frame 102 continues to pivot to fold the upper section of the artificial tree back on the lower tree frame 104. It is noted that the degree of pivoting of both tree frame sections may be limited by the bulk of the artificial tree, which is not shown in FIG. 2. As such, while FIG. 2 shows the storage position as horizontal with respect to the tree stand base 106 and to a supporting surface, such as a floor (not shown), in some examples a storage position can be any position that renders the tree more easily transported and/or stored as compared to the display position. Such is particularly true as the size of the artificial tree increases. In some examples, a pivot stop can be coupled to, or integrated with, the artificial tree stand, the tree support base, or any other component thereof, in order to limit the pivoting range of the upper tree frame, the lower tree frame, or both. By limiting the pivoting range, the folding force on the artificial tree can be limited, thus providing further protection. Such can be particularly useful for larger or bulkier trees.

Figure 3:
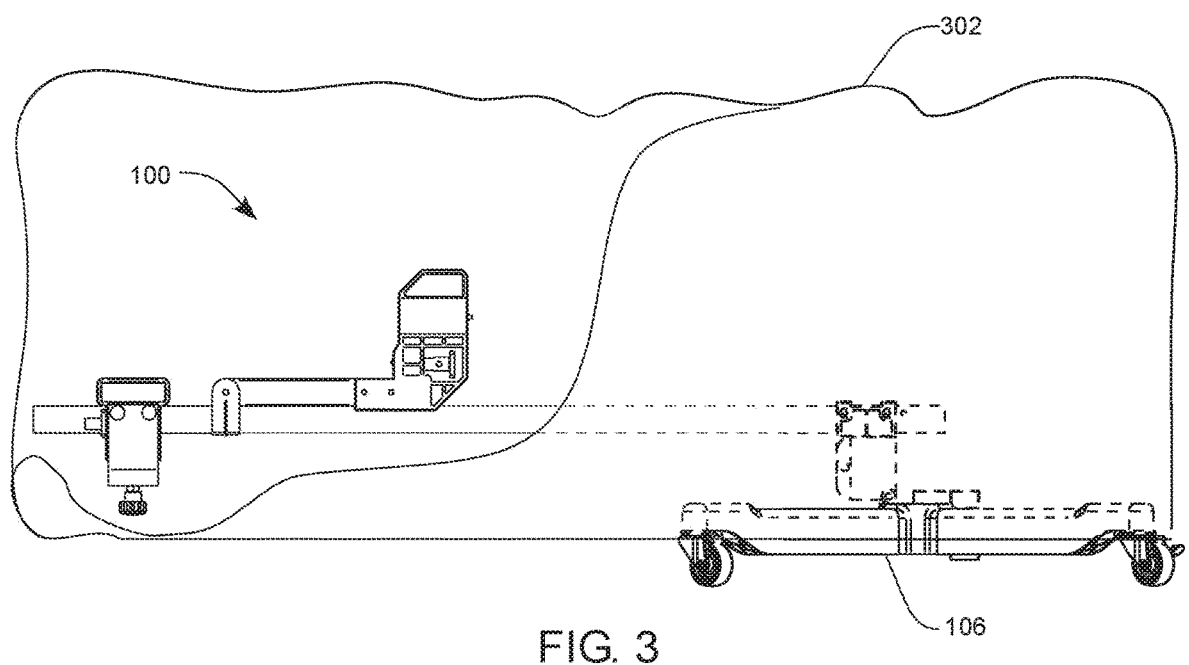
FIG. 3 illustrates a side view of an artificial tree stand in a storage position in a storage bag in accordance with an example embodiment.

FIG. 3 shows an example of an artificial tree stand 100 contained in a storage bag 302 in a horizontal storage position. As such, when the artificial tree stand 100 is folded from the display position to a storage position, the storage bag 102 can be drawn up and around the artificial tree stand 100, including any associated artificial tree. In some cases, the storage bag 302 can be separate from the artificial tree stand 100. In other cases, the storage bag 302 can be coupled to the artificial tree stand 100, and either hidden away when in the storage position or used as a decorative embellishment, such as, for example a tree skirt. In one example, the storage bag 302 can be coupled to the tree stand base 106, which can facilitate drawing the storage bag 302 over the artificial tree stand 100 for storage. As has been noted, in some examples the storage position can be a vertical storage position, whereby the lower tree frame remains locked in place at the tree stand base, and the upper tree frame is pivoted downward to fold back along the lower tree frame. In such cases, the storage bag can be oriented in a vertical position and drawn up and over the lower tree frame.

Figure 4:
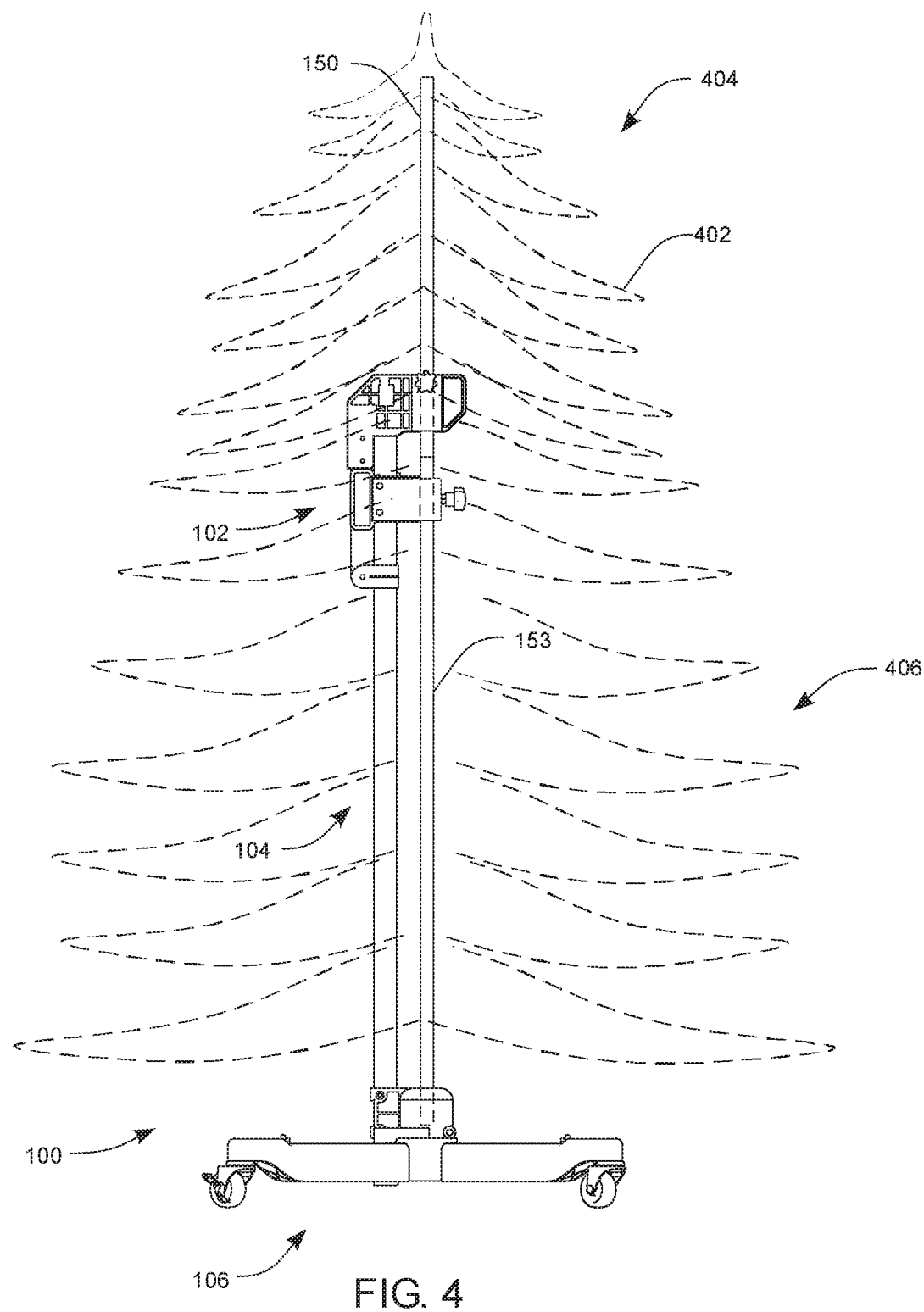
FIG. 4 illustrates a side view of an artificial tree stand supporting an artificial tree in a display position in accordance with an example embodiment.

FIG. 4 shows an example of an artificial tree 402 secured to the artificial tree stand 100 in a display position. The upper trunk portion 150 of an upper tree section 404 of the artificial tree 402 is secured to the upper tree frame 102. Similarly, the lower trunk portion 152 of a lower tree section 406 of the artificial tree 402 is secured to the lower tree frame 106 and the tree stand base 106. It is noted that the upper tree section 404 may not be the upper-most tree section of the artificial tree. In some cases, for example, the upper tree section may be configured to receive an additional tree section, either a terminal tree top section that is not secured by the artificial tree stand, or an additional tree section that is secured by the artificial tree stand, which can be either an intermediate section or a terminal tree top section. Such an additional tree section can be secured by a tree frame positioned above the upper tree section and pivotally coupled to an extension of the lower tree frame or the upper tree frame.

Figure 5A:
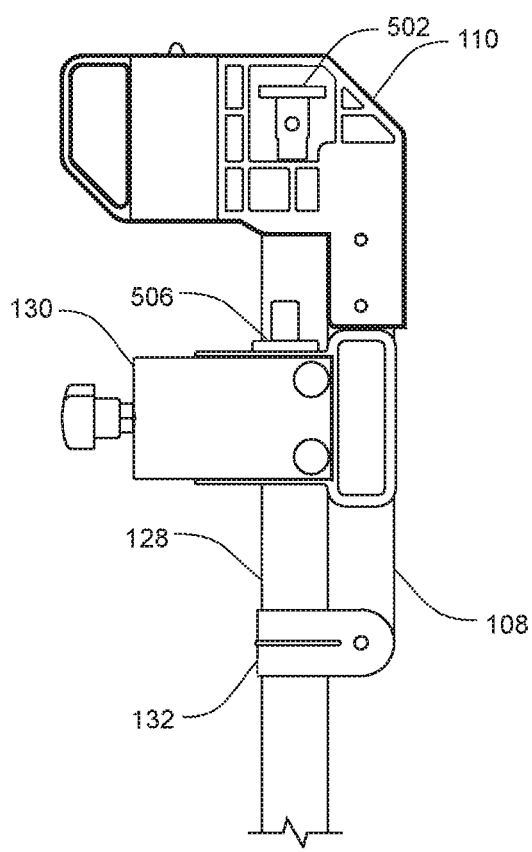
FIG. 5a illustrates a side view of an upper tree frame portion of an artificial tree stand in accordance with an example embodiment.
Figure 5B:
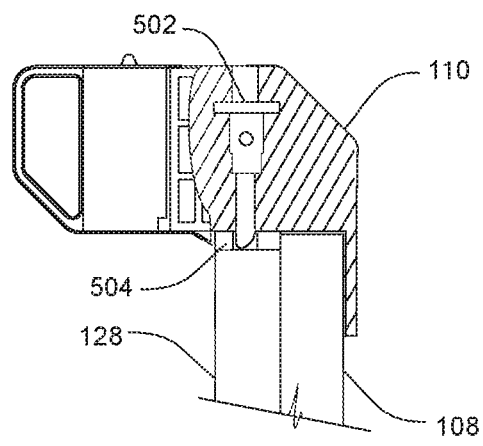
FIG. 5b illustrates a side view of an upper tree frame portion having a portion cut away in accordance with an example embodiment.

FIGS. 5a shows an example view of an upper tree frame from the opposite side as shown in the previous figures. As has been described, the upper tree frame is locked into the display position, which can be accomplished by a variety of mechanisms. In one example, the upper tree frame can include an upper switch 502 that, when in a rest position, engages the lower tree frame in an indentation 504 of the lower linear support 128. When raised vertically, the portion of the upper switch 502 engaged in the indentation 504 is lifted therefrom, thus releasing the upper linear support 108 to rotate away from the lower linear support 128. Similarly, a lower switch 506, located near the lower trunk lock 130 in this example, can be similarly lifted to release a similarly engaged indentation in the tree stand base (not shown). Such can be accomplished by a variety of techniques, including a cable, rod, or other linkage between the switch and the engaged portion. Additionally, the lower switch can be located in or at the tree stand base, which in some examples can be a foot switch. In some examples, it is contemplated that a single switch can be utilized to release both the upper tree frame and the lower tree frame to pivot. FIG. 1b shows a cutaway portion of the upper trunk lock 110.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:
1. An artificial tree stand device, comprising:
an upper tree frame configured to couple to and support an upper trunk portion of an artificial tree;
a lower tree frame configured to couple to and support a lower trunk portion of the artificial tree, the upper tree frame being pivotally coupled to the lower tree frame;
a tree stand base pivotally coupled to the lower tree frame; and
wherein the upper tree frame, the lower tree frame, and the tree support base lock into a vertical position to display the artificial tree, and at least the upper tree frame unlocks to allow the upper tree frame to pivot into a storage position.

2. The device of claim 1, wherein the upper tree frame and the lower tree frame are configured to pivot in opposite directions from one another.

3. The device of claim 1, wherein:
the upper tree frame comprises an upper trunk lock to couple and support the upper trunk portion of the artificial tree; and
the lower tree frame comprises a lower trunk lock to couple and support the lower trunk portion of the artificial tree, wherein the upper trunk lock and the lower trunk lock are positioned to align the upper trunk portion and the lower trunk portion of the artificial tree along a common central axis.

4. The device of claim 3, wherein the upper tree frame and the lower tree frame are aligned along a common central axis.

5. The device of claim 3, wherein the upper tree frame is offset from a central axis of the lower tree frame, such that the upper tree frame is positioned adjacent to the lower tree frame.

6. The device of claim 1, wherein the upper tree frame further comprises an upper pivot lock to secure the upper tree frame relative to the lower tree frame when engaged, and to allow the upper tree frame to pivot relative to the lower tree frame when disengaged.

7. The device of claim 6, wherein the upper tree frame further includes a switch functionally coupled to the upper pivot lock, the switch configured to disengage the upper pivot lock.

8. The device of claim 1, wherein the lower tree frame further comprises a lower pivot lock to secure the lower tree frame relative to the tree stand base when engaged, and to allow the lower tree frame to pivot relative to the tree stand base when disengaged.

9. The device of claim 8, wherein the lower tree frame further includes a switch functionally coupled to the lower pivot lock, the switch configured to disengage the lower pivot lock.

10. The device of claim 1, further comprising:
an upper pivot lock to secure the upper tree frame relative to the lower tree frame when engaged, and to allow the upper tree frame to pivot relative to the lower tree frame when disengaged;
a lower pivot lock to secure the lower tree frame relative to the tree stand base when engaged, and to allow the lower tree frame to pivot relative to the tree stand base when disengaged; and
a switch functionally coupled to the upper pivot lock and the lower pivot lock, the switch configured to disengage both the upper pivot lock and the lower pivot lock.

11. The device of claim 1, wherein the storage position is the lower tree frame in the vertical position and the upper tree frame is pivoted into a nonvertical position.

12. The device of claim 11, further comprising a storage bag coupled to the tree stand base, the storage bag being configured to receive the upper tree frame and the lower tree frame in the storage position.

13. The device of claim 1, wherein the upper tree frame, the lower tree frame, and the tree support base lock into the vertical position to display the artificial tree, and the upper tree frame and the lower tree frame unlock to allow both the upper tree frame and the lower tree frame to pivot into the storage position.

14. The device of claim 13, further comprising a storage bag coupled to the tree stand base, the storage bag being configured to receive the upper tree frame and the lower tree frame in a nonvertical position as the storage position.

15. The device of claim 1, wherein at least one of the upper tree frame or the lower tree frame includes a handle for manipulation.

16. An artificial tree system, comprising:
an artificial tree having at least an upper tree segment and a lower tree segment;
an upper tree frame configured to couple to and support the upper tree segment;
a lower tree frame configured to couple to and support the lower tree segment, the upper tree frame being pivotally coupled to the lower tree frame;
a tree stand base pivotally coupled to the lower tree frame; and
wherein the upper tree frame, the lower tree frame, and the tree support base lock into a vertical position to display the artificial tree, and at least the upper tree frame unlocks to allow the upper tree frame and the upper tree segment to pivot into a storage position.

17. The system of claim 16, wherein the upper tree frame and the lower tree frame are configured to pivot in opposite directions from one another.

18. The system of claim 16, wherein:
the upper tree frame comprises an upper trunk lock to couple and support the upper tree segment; and
the lower tree frame comprises a lower trunk lock to couple and support the lower tree segment, wherein the upper trunk lock and the lower trunk lock are positioned to align the upper tree segment and the lower tree segment along a common central axis.

19. The system of claim 18, wherein the upper tree frame and the lower tree frame are aligned along a common central axis.

20. The system of claim 18, wherein the upper tree frame is offset from a central axis of the lower tree frame, such that the upper tree frame is positioned adjacent to the lower tree frame.

21. The system of claim 16, wherein the upper tree frame further comprises an upper pivot lock to secure the upper tree frame relative to the lower tree frame when engaged, and to allow the upper tree frame to pivot relative to the lower tree frame when disengaged.

22. The system of claim 21, wherein the upper tree frame further includes a switch functionally coupled to the upper pivot lock, the switch configured to disengage the upper pivot lock.

23. The system of claim 16, wherein the lower tree frame further comprises a lower pivot lock to secure the lower tree frame relative to the tree stand base when engaged, and to allow the lower tree frame to pivot relative to the tree stand base when disengaged.

24. The system of claim 23, wherein the lower tree frame further includes a switch functionally coupled to the lower pivot lock, the switch configured to disengage the lower pivot lock.

25. The system of claim 16, further comprising:
an upper pivot lock to secure the upper tree frame relative to the lower tree frame when engaged, and to allow the upper tree frame to pivot relative to the lower tree frame when disengaged;
a lower pivot lock to secure the lower tree frame relative to the tree stand base when engaged, and to allow the lower tree frame to pivot relative to the tree stand base when disengaged; and a switch functionally coupled to the upper pivot lock and the lower pivot lock, the switch configured to disengage both the upper pivot lock and the lower pivot lock.

26. The system of claim 16, wherein the storage position is the lower tree frame in the vertical position and the upper tree frame is pivoted into a nonvertical position.

27. The system of claim 26, further comprising a storage bag coupled to the tree stand base, the storage bag being configured to receive the upper tree frame and the lower tree frame in the storage position.

28. The system of claim 16, wherein the upper tree frame, the lower tree frame, and the tree support base lock into the vertical position to display the artificial tree, and the upper tree frame and the lower tree frame unlock to allow both the upper tree frame and the lower tree frame to pivot into the storage position.

29. The system of claim 28, further comprising a storage bag coupled to the tree stand base, the storage bag being configured to receive the upper tree frame and the lower tree frame in a nonvertical position as the storage position.

30. The system of claim 16, wherein at least one of the upper tree frame or the lower tree frame includes a handle for manipulation.

* * * * *